(12) United States Patent
Miller

(10) Patent No.: US 7,764,163 B2
(45) Date of Patent: Jul. 27, 2010

(54) MODULAR RADIO FREQUENCY IDENTIFICATION UNIT

(75) Inventor: David Paul Miller, Brewerton, NY (US)

(73) Assignee: Jadak Technologies, Inc., Liverpool, NY (US)

( * ) Notice: Subject to any disclaimer, the term of this patent is extended or adjusted under 35 U.S.C. 154(b) by 694 days.

(21) Appl. No.: 11/557,550

(22) Filed: Nov. 8, 2006

(65) Prior Publication Data

US 2008/0106387 A1    May 8, 2008

(51) Int. Cl.
*H04Q 5/22* (2006.01)

(52) U.S. Cl. .................................. 340/10.1; 340/10.51

(58) Field of Classification Search ................ 340/10.1, 340/10.3, 10.4, 10.41, 10.51, 572.1

See application file for complete search history.

(56) References Cited

U.S. PATENT DOCUMENTS

| 5,850,187 | A  | * | 12/1998 | Carrender et al. | ........... 340/10.6 |
| 6,330,971 | B1 | * | 12/2001 | Mabry et al. | ................ 340/10.1 |
| 6,677,852 | B1 | * | 1/2004 | Landt | ........................ 340/10.1 |
| 2004/0196143 | A1 | * | 10/2004 | Crump et al. | ............... 340/10.1 |
| 2005/0270142 | A1 | * | 12/2005 | Moreaux et al. | ......... 340/10.51 |
| 2007/0252719 | A1 | * | 11/2007 | Ray | ........................ 340/572.1 |

* cited by examiner

*Primary Examiner*—Thomas J Mullen
(74) *Attorney, Agent, or Firm*—David L. Nocilly; George R. McGuire; Bond Schoeneck & King, PLLC

(57) ABSTRACT

A radiofrequency identification (RFID) transceiver and microcontroller packaged into a host controllable module for interfacing with a legacy or new host device. The module includes an interface for easy adaptation into a host device and the module microcontroller is programmed to interpret commands sent by the host device and operate the RFID transceiver accordingly. The module may further include a speaker or light emitting diode (LED) for alerting a user as to whether a RFID tag presented to the module has been successfully interrogated.

10 Claims, 4 Drawing Sheets

MODULAR RADIO FREQUENCY IDENTIFICATION UNIT

BACKGROUND OF THE INVENTION

1. Field of the Invention

The present invention relates to data collection systems and, more specifically, to a system and method for providing radio frequency identification in a host controllable module.

2. Description of the Related Art

Radio frequency identification (RFID) is a wireless communication technology that utilizes radio waves for automatic identification and data capture of information for the purpose of identifying and tracking objects, people, or even animals. Signals in the radio frequency (RF) range of the electromagnetic spectrum are used to communicate data between two transceiver devices. An RFID system typically consists of the three main components: a tag, a reader, and the software/firmware for controlling the system. Tags are placed on objects or people and directly or indirectly contain information about the object or person. The reader uses RF energy to interrogate the tag and read the information it contains, or even write data to the tag.

Technologies such as RFID can play an important role in various fields by automating processes and improving safety and security. For example, the ability to more accurately track objects and instantly provide data about the object is becoming a particularly important tool in the medical field, where automated systems can help improve safety procedures and limit human errors. For example, RFID technology may be used for tracking medical devices to ensure that the right device is available to the correct patient at the correct time, servicing and administering drugs, or to track the location of high-risk devices like implants that may relocate within a patient.

Conventional systems for utilizing RFID are often rudimentary, particularly in the medical field. For example, RFID systems generally require middleware applications that provide an interface between the readers and the host device or computer. The middleware filters and structures the data read from the tags and integrates it into the host application, which stores the information from the tag or dictates the action to be taken with the information. Middleware and host data management software applications are usually provided by an RFID vendor or by third party applications developers. These systems are not, however, capable of combining the advantages of RFID into a modular package that may be easily integrated into existing medical devices or adapted for use in new systems and easily controlled by the user. Instead, they require the integration of multiple systems and the use of sophisticated processing software to accomplish any functions beyond rudimentary RFID interrogation. In essence, these systems only provide for protocol changes, and are not capable of use in connection with host devices that have limited command capabilities.

BRIEF SUMMARY OF THE INVENTION

It is a principal object and advantage of the present invention to provide a modular RFID system.

It is an additional object and advantage of the present invention to provide a modular RFID system that is controllable via a host computer.

It is a further object and advantage of the present invention to provide a modular RFID system that is field programmable.

Other objects and advantages of the present invention will in part be obvious, and in part appear hereinafter.

In accordance with the foregoing objects and advantages, the present invention comprises a modular and scalable system that integrates RFID functions into a host controlled device. More particularly, the present invention comprises an RFID reader interconnected to a single host interface by a microcontroller that is controllable via a host computer or device. The microcontroller of the module is configurable via the host interface to provide RFID reading or writing. The microcontroller of the module is further programmed to allow the host computer to trigger the RFID reader. The module of the present invention may be easily retrofit into a pre-existing system and programmed to perform a variety of RFID tasks previously unavailable to the system, or easily integrated into a new system without the need for additional hardware and software for performing interrogation data processing. In addition, the module may be programmed or reprogrammed in the field after incorporation into a host device.

BRIEF DESCRIPTION OF THE DRAWINGS

The present invention will be more fully understood and appreciated by reading the following Detailed Description in conjunction with the accompanying drawings, in which.

DETAILED DESCRIPTION OF THE INVENTION

Figure 1:
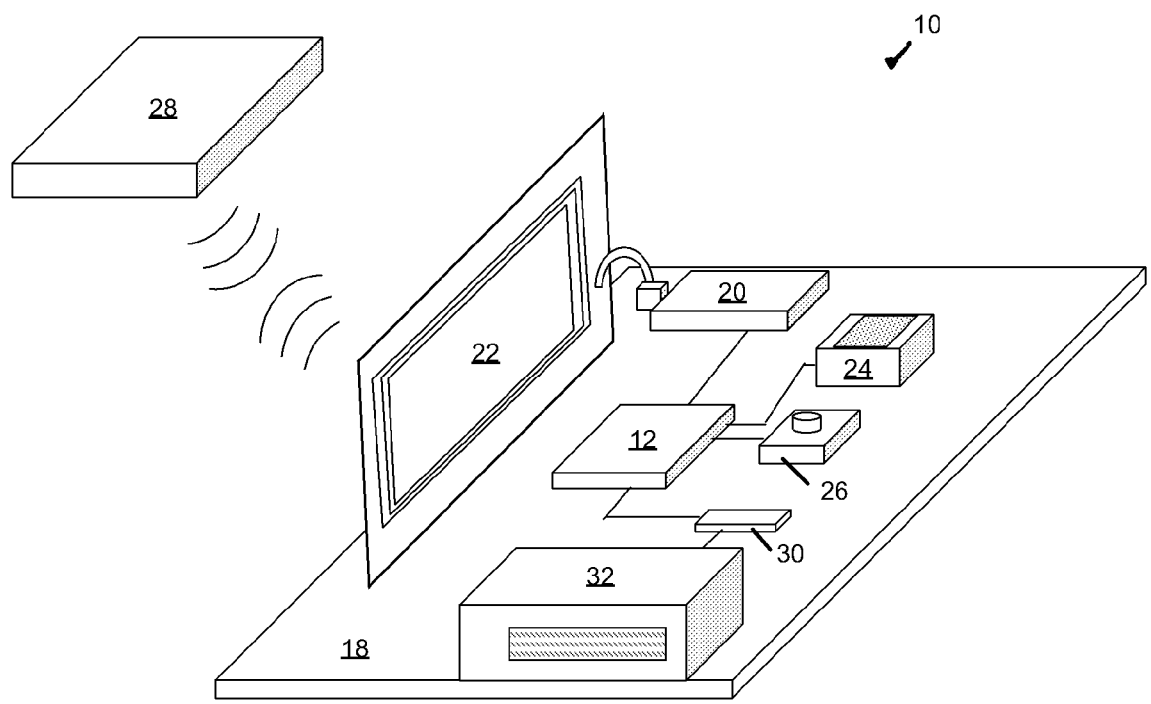
FIG. 1 is a perspective view of a host controllable RFID module according to the present invention.
Figure 2:
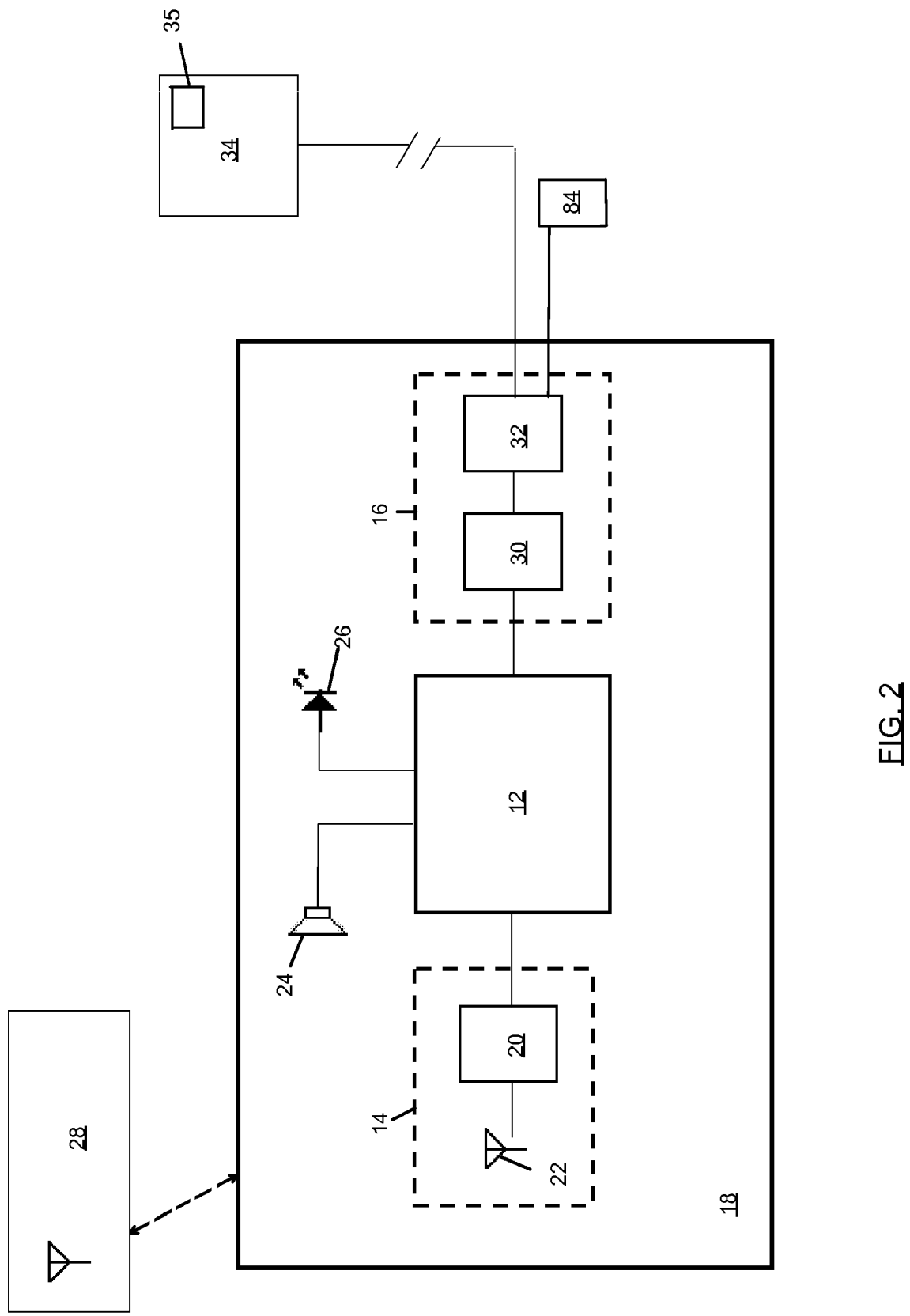
FIG. 2 is a schematic of a host controllable RFID module according to the present invention.

Referring now to the drawings, wherein like reference numerals refer to like parts throughout, there is seen in FIGS. 1 and 2 an RFID module 10 according to the present invention. Module 10 generally comprises a microcontroller 12 that interconnects a first submodule, such as an RFID unit 14, to a single host interface 16. Module 10 may be arranged on a single printed circuit board 18 and encased as a single unit or housing. RFID unit 14 further comprises an RFID transceiver 20 and an antenna 22 associated therewith. Module 10 is designed to provide content level info to an attached device based only on the use of high-level abstract commands or command sets.

RFID unit 14 supports standard RFID protocols, such as the TI Tag-it transponder protocol, ISO 15693, or IS014443-2. For these protocols, transceiver 20 operates at 13.56 MHz, and may comprise a S6700 Multi-Protocol Transceiver IC available from Texas Instruments of Dallas, Tex. Depending on the application, other frequency transceivers may be more appropriate based on transponder protocol, target range, power availability, cost, etc. RFID unit 14 may further include a speaker 24 or light emitting diode (LED) 26 associated therewith for audibly or visibly indicating a successful interrogation of a RFID tag 28.

Antenna 22 is preferably a loop antenna of various sizes and turns implemented on a printed circuit board and connected to module 10, or a wire loop installed antenna installed directly onto module 10. Antenna 22 may also be comprised of a small coil of wire wound on a ferromagnetic cylinder. Antenna 22 may be positioned remotely using an external connector, such as a MMCX coaxial connector, thereby reducing the footprint of module 10. RFID transceiver 20 may be programmed to interrogate passive or active tags, process signals received from such tags (e.g., analog to digital conversion), and provide the information from RFID tags 28 to microcontroller 12.

Host interface 16 comprises a host transceiver 30 and a host connector 32 for interconnection to a host device 34. Interface 16 may comprise a conventional RS232 transceiver and associated 12 pin RJ style jack. For example, an ADM202EARN available from Analog Devices, Inc. of Norwood, Mass. is a suitable RS-232/V.28 interface device having compliant levels of electromagnetic emissions and immunity. Alternatively, interface 16 may comprise other conventional buses, such as USB, Ethernet, IEEE 1394, 12C, SPI, or PCMCIA, or other connector styles, such as an FFC style to an embedded host or another module 10. Interface 16 may also comprise a wireless transceiver in lieu of connector 32 for wireless communication to a host computer. A Stewart Connector Systems Inc. SS-641010S-A-NF may serve as connector 32 for mating with a Stewart Connector 937-SP-361010-031 matching connector of host device 34. Host interface 16 may also comprise a Molex MX52588 connector. Regardless of the type of connector 32 used, host transceiver 30 is programmed with the applicable protocols for interfacing with a host computer, such as USB, Bluetooth(r), Ethernet, and IRDA protocols.

Microcontroller 12 comprises a conventional programmable microcontroller having on-chip peripherals, such as central processing unit, Flash EEPROM, RAM, asynchronous serial communications interface modules, serial peripheral interfaces, Inter-IC Buses, timer modules, pulse modulators with fault protection modules, pulse width modulators, analog-to-digital converters, and digital-to-analog converters. Additionally, the inclusion of a PLL circuit allows power consumption and performance to be adjusted to suit operational requirements. In addition to the I/O ports dedicated I/O port bits may be provided. Microcontroller 12 may further include an on-chip bandgap based voltage regulator that generates an internal reference supply voltage from an external supply range. Microcontroller 12 may comprise a Motorola MC9S12E128 or an Intel PXA270.

Interrogation of RFID tag 28 is accomplished by microcontroller 12, which receives and interprets host commands sent from host device 34, and then executes the appropriate functions by driving RFID unit 14 accordingly. For example, RFID unit 14 may be triggered by serial commands sent to module 10 from a host device 34, or by a hardware button 84 communicating directly with connector 32 or through host device 38. Microcontroller 12 may further be programmed to execute the functions otherwise performed by RFID transceiver 20 and host transceiver 30, thereby reducing the amount of circuitry and hardware required by module 10.

Microcontroller 12 directs RFID interrogation using RFID unit 14 in at least two modes. RFID unit 14 may operate in a free form mode that reads and writes data as a continuous stream, which is limited only by memory capacity. Once RFID unit 14 is triggered, depending on the mode, data is transmitted from the serial port. Second, RFID unit 14 may operate in block mode, where a user may access individual blocks of information via commands sent from host 34 through interface 16 and interpreted by microcontroller 12.

External control of module 10 is accomplished by a predefined protocol and set of serial host commands that are sent to module 10 from another microcontroller 35 in host device 34. The host commands are received by microcontroller 12, which executes the appropriate steps based on the content of the host command. For example, microcontroller 12 may be programmed to recognize host commands that trigger the activation of RFID unit 14. Host commands may also be defined to whether the data obtained from RFID unit 14 is stored locally in module 10 or passed directly through interface 16 to host device 34. Host commands may also be provided that enable the various scanning modes available in RFID unit 14, control the amount of time that RFID unit 14 will attempt scanning before timing out, direct the reading and writing of data, and select the location where the data is to be written. With regard to RFID unit 14, commands for opening and closing connections to RFID transceiver 20, as well as commands that return the status of the connection are useful. For example, a host command received from host device 34 may trigger the capture of RFID data by RFID unit 14. When the scan is complete, a timeout occurs or triggering is turned off via a second host command, and the appropriate feedback is provided to host device 34. The host commands may be preprogrammed into microcontroller 12 and separately provided to host device 34 as a software package for controlling module 10. In addition, software for editing host commands may be supplied to host device 34 to allow a user to edit, add, or delete commands and the corresponding functionality.

Microcontroller 12 is thus programmed to perform the functions of an on-board interpreter for communicating with RFID unit 14. Microcontroller 12 converts simple, mnemonic-style or ASCII host commands, which are common and easily integrated into legacy host devices 34 (or new host devices 34), into the complex binary control commands required for the operation of RFID, such as RFID unit 14. Microcontroller 12 further translates the complex binary data received from RFID unit 14, which is generally provided according to one or more accepted RFID protocols, into simple data messages that are capable of being understood and interpreted by host device 34 without the need for sophisticated programming. For example, a conventional RFID trigger command may comprise an ASCII or binary string of twenty or more bytes designating particular flags, describing the type of command, identifying the tag type, pointing to particular memory locations on the tag that will be read, identifying the amount of data to be read, as well as including error correction elements, such as a CRC. As result, host device 34 must be substantially reprogrammed or include sophisticated applications to manage even basic commands such as the aforementioned trigger commands. In addition, host device 34 must be reprogrammed or include sophisticated applications to manage the response generated by these complicated commands. For example, a conventional host command to read the data from a tag will generate a tag response that includes several bytes confirming the various command parameters (i.e., the command bytes designating particular flags, describing the type of command, identifying the tag type, pointing to particular memory locations on the tag to read, identifying the amount of data to read, and error correction elements) with the desired tag data incorporated therein. Host device 34 must therefore be programmed to extract the pertinent tag data from the rest of the information to provide the desired response.

In a conventional system, a host device 34 must be programmed to provide a command, such as "<07><28><24><01><01><04><DE><FF>", to trigger tag interrogation. A tag encoded with the data "Once Upon a Time" will return the sequence "<13><24> Once Upon a Time <C5><4F>" back to the host. Thus, in order to comprehend the tag data, host device 34 must be programmed to parse out the unwanted data (i.e., the bytes preceding and following the desired data string) or otherwise interpret the response in order to extract the actual data of interest.

By contrast, microcontroller 12 is programmed to initiate triggering of RFID unit 14 in response to activation of a manual trigger or upon receipt of a simple host command sent by host device 34. Host command is preferably comprised of elements already known and available to host device 34, such as ASCII letters. For example, the simple command <16><54><0D> may be configured to trigger RFID unit 14 interconnected to microcontroller 12. Microcontroller 12 is further programmed to return the tag data "once upon a time" only, without any of the additional or extraneous bytes that would otherwise require host device 34 to further interpret the response. For example, a one-time set-up sequence, such as <02><01><0B><05><03><0E><2E><02><01><0A><34><03><3E><2E> may be sent to module 10 to indicate to microcontroller 12 the nature of the block data to be read from or written to a tag. It should be recognized by those of skill in the art that the essential commands for reading and writing to an RFID tag may be assigned any simple string and microcontroller 12 programmed accordingly.

Microcontroller 12 may further be programmed to write tag data and read tag data in a "free form" mode, thereby alleviating the need for specific data block references in the command sequences, in addition to the conventional block data format that utilizes specific data addressing. In "free form" mode, microcontroller 12 is programmed to write the basic data to a tag coupled with just a simple delimiter byte signifying that the end of the relevant data has occurred. The relevant data string, "Once Upon A Time" in the example described above, would thus be written to a tag and immediately followed by delimiter bytes. The relevant data string may thus be any length as long as it is coupled with delimiter bytes and capable of fitting on the tag.

When reading "free form" data, microcontroller 12 simply extracts the tag data until the delimiter bytes are reached. "Free form" mode thus significantly increases the speed at which data may be read from a tag as extraneous data is not processed, which also effectively decreases the error rate as there is less likelihood for data corruption. "Free form" mode thus has ability to read a partially loaded tag as once microcontroller 12 has determined that it has received the end of the target data there is no need to read subsequent data blocks. Microcontroller 12 may be programmed or configured to determine the data types or tag types that may be encountered, thereby ensuring the only the appropriate and minimum number of blocks need to be read in order to retrieve the desired data. "Free form" mode also allows host device 34 to interact with different types of tags or data types as microcontroller 12 can identify the tag type, select the most appropriate delimited data if the identified tag was written in "free form" mode, interpret the delimited data, and provide only the intended results to host device 34, e.g., "Once Upon A Time" so that no further interpretation of the tag data is required. Microcontroller may be initially factory configured to recognize the various tag types in conventional use, or host device 34 may be provided with software for programming microcontroller 12 with available tag types.

The host command and tag response interpreting functions of microcontroller 12 thus alleviates the burden placed on host device 34 by conventional RFID systems. As host device 34 remains substantially ignorant of the sophisticated programming and advanced communication applications required for RFID, the present invention may be easily retrofit into legacy host devices that have only limited processing capabilities or upgradability, or may be easily integrated into new host devices to provide RFID technology without the need for additional engineering or sophisticated programming of a system that is generally directed toward unrelated applications. Along these lines, microcontroller 12 may be programmed to append a data sequence, such as a carriage return or a line feed, to further avoid the need for host processing. In this manner, RFID module 10 may be interconnected to even the simplest of external devices, such as a basic visual display, for presentation of the tag information to a user.

Figure 3:
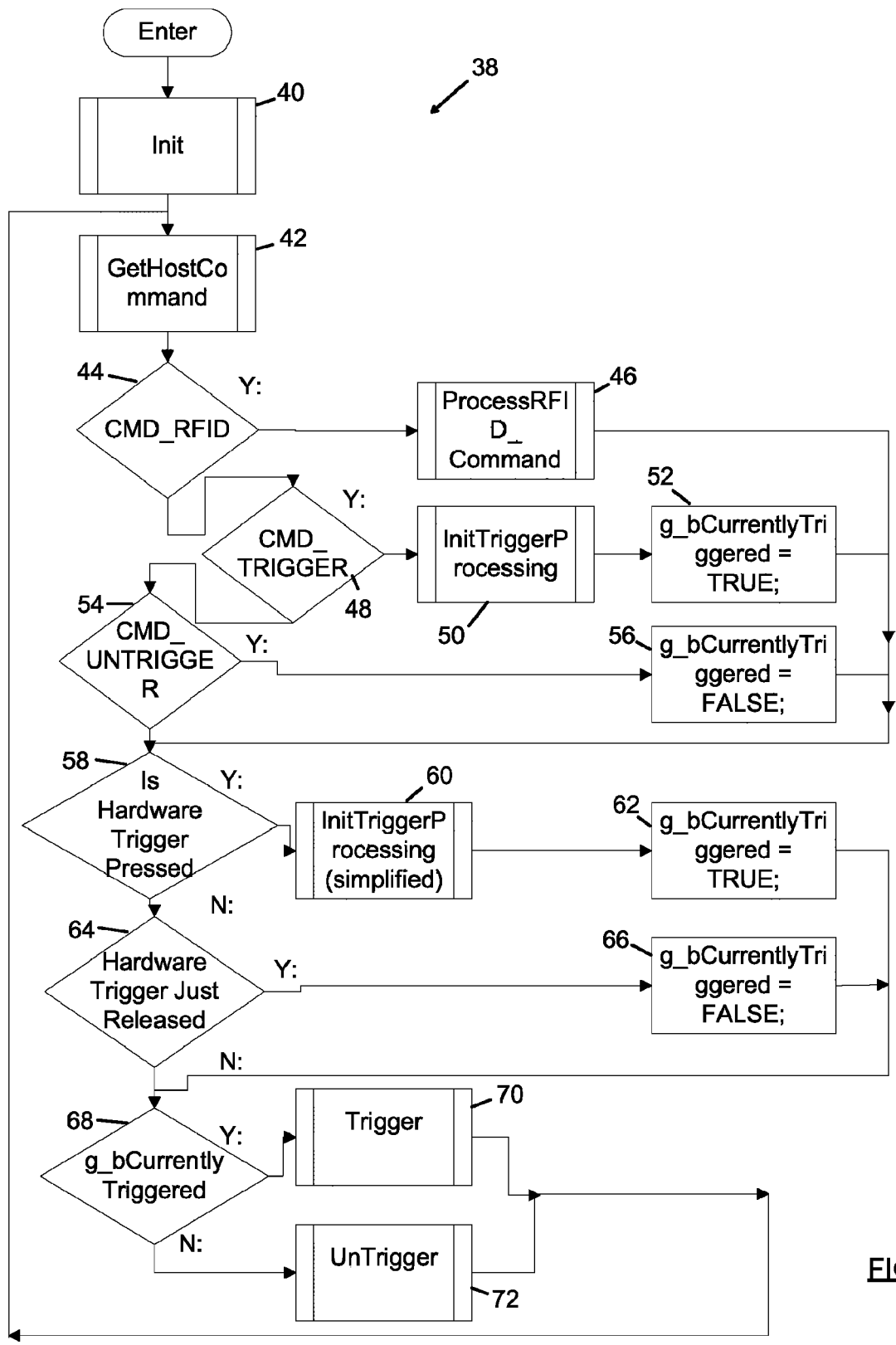
FIG. 3 is a flowchart of main-line processing in a host controllable RFID module according to the present invention.

FIG. 3 illustrates an embodiment of main-line host command processing 38 in microcontroller 12 according to the present invention. The specific nomenclature used to define the various routines may be varied by the user or software developer provided that the appropriate functions are performed, and any number of routines and subroutines may be defined and executed in various orders to accomplish RFID reading and processing according to the present invention. After initialization 40, microcontroller 12 runs a routine, referred to as GetHostCommand 42, to check whether a host command has been received from host device 34. Upon receipt of a host command, microcontroller 12 checks whether the command is an RFID control command, CMD_RFID 44. If so, the command is processed by routine ProcessRFID_Command 46. If not, a check is performed to see whether the command is a trigger command, CMD_TRIGGER 48. If the command is a trigger command, the appropriate instructions are processed to initiate triggering, InitTriggerProcessing 50 and a variable, referred to as CurrentlyTriggered, is assigned the value of TRUE 52. If the command is not a trigger command, a check is performed to see whether the command is an untrigger command, CMD_UNTRIGGER 54. If the command is an untrigger command the variable CurrentlyTriggered is assigned the value of FALSE 56.

After any of the above processing, microcontroller 12 checks to see whether a hardware trigger has been pressed 58. If so, the triggering processing is performed, InitTriggerProcessing 60, and the variable CurrentlyTriggered, is assigned the value of TRUE 62. If a hardware trigger has not been pressed 58, a check is performed to determine whether a hardware trigger has just been released 64. If so, the CurrentlyTriggered variable is assigned the value of FALSE 66. Finally, microcontroller 12 checks to see whether CurrentlyTriggered is TRUE or FALSE 68, and then calls the routine Trigger 70 to trigger the RFID unit 14, or call the routine UnTrigger 72, to untrigger the RFID unit 14.

Figure 4:
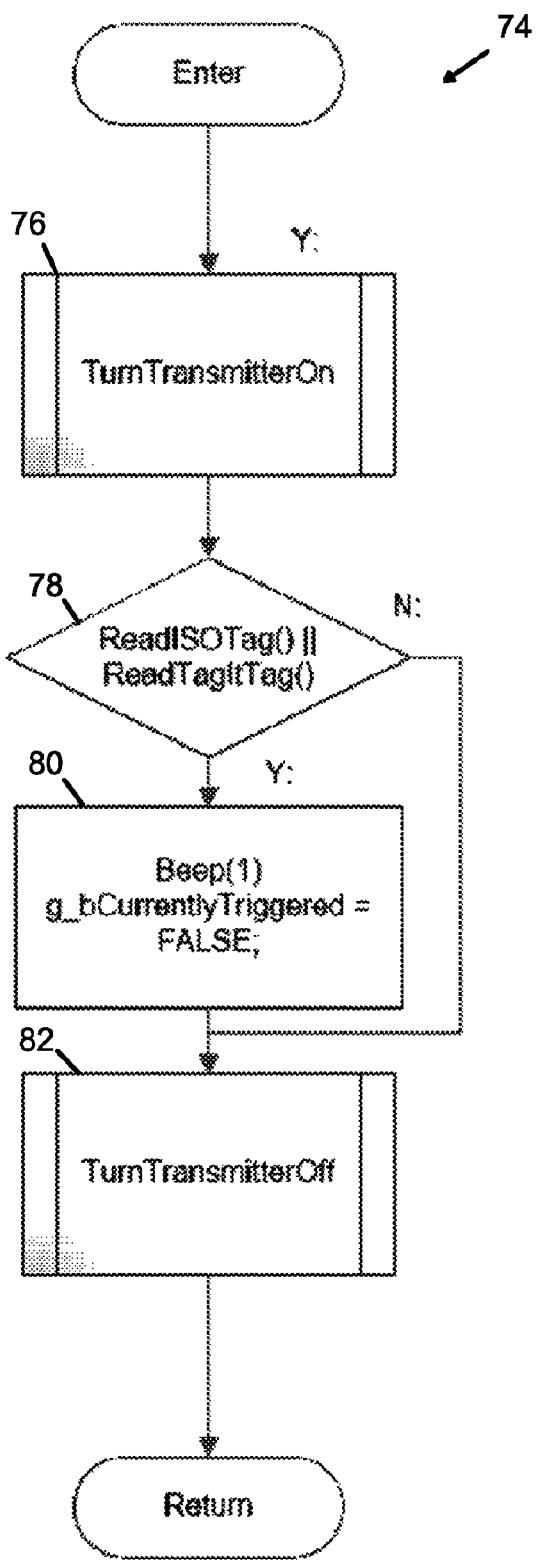
FIG. 4 is a flowchart of trigger command processing in a host controllable RFID module according to the present invention.

There is seen in FIG. 4, a detailed trigger process 74 according to the present invention. Process 74 begins by turning the transmitter (of RFID unit 14) on 76. A check is performed to determine whether an RFID tag, such as tag 28, has been successfully interrogated 78. If so, tone is sounded 80 to denote successful interrogation and the transmitter is turned off 82. If successful interrogation of a tag was not determined at step 78, control proceeds directly to turn the transmitter off 82.

What is claimed is:

1. A modular device for providing radiofrequency identification (RFID) capabilities to a host device, comprising:
   an RFID transceiver;
   a host interface for interconnecting to said host device and receiving at least one host command;
   a microcontroller interconnected to said RFID transceiver and said host interface, wherein said microcontroller includes a first interpreter for receiving at least one host command sent by said host device and a second interpreter for receiving data collected by said RFID transceiver and providing only certain portions of said data collected by said RFID transceiver to said host device; and wherein said microcontroller controls operation of said RFID transceiver based on receipt of said at least one host command and is programmed to trigger and untrigger said RFID transceiver based upon receipt of said at least one host command.

2. The device of claim 1, wherein said data is collected from an RFID tag.

3. The device of claim 2, wherein said microcontroller outputs data collected by said RFID transceiver in response to the receipt of a predetermined host command.

4. A modular device for providing radiofrequency identification (RFID) capabilities to a host device, comprising:
   a microcontroller including an interpreter for receiving at least one host command sent by said host device;
   an RFID transceiver interconnected to said microcontroller;
   a host interface interconnected to said microcontroller for interconnecting said modular device to a host device and receiving said at least one host command;
   wherein said microcontroller controls operation of said RFID transceiver based on receipt of said at least one host command; and
   wherein said microcontroller includes a data interpreter for receiving data from said RFID transceiver and transmitting only a predetermined portion of said data received from said RFID transceiver to said host device through said host interface.

5. The device of claim 4, wherein said microcontroller is programmed to retrieve a predetermined portion of data previously stored in a remote RFID tag.

6. The device of claim 5, wherein said predetermined portion of data previously stored in a remote RFID tag comprises a data string followed by delimiter bytes.

7. The device of claim 4, wherein said microcontroller is programmed to add delimiter bytes to a data string supplied by said host device.

8. The device of claim 7, wherein said microcontroller is programmed to write said data string and said delimiter bytes to a remote RFID tag using said RFID transceiver.

9. A method of providing radiofrequency identification (RFID) capabilities to a host device including a first microcontroller and an interface, said method comprising the steps of:
   interconnecting a second microcontroller and an RFID transceiver to said first microcontroller through said interface;
   sending at least one host command to said second microcontroller;
   interpreting said at least one host command;
   controlling operation of said RFID transceiver based on said at least one host command by triggering said RFID transceiver in response to receipt of a first predetermined host command;
   acquiring data from an RFID tag presented to said host device;
   interpreting said data acquired by said RFID transceiver by removing extraneous bytes; and
   providing said interpreted data to said host device.

10. The method of claim 9, further comprising the step of triggering said RFID transceiver with a hardware trigger.

* * * * *